US012639454B2

(12) United States Patent
Sloane et al.

(10) Patent No.: US 12,639,454 B2
(45) **Date of Patent: \*May 26, 2026**

(54) SYSTEM AND METHOD FOR PROVIDING COMPLEX DATA ENCRYPTION

(71) Applicant: BANK OF AMERICA CORPORATION, Charlotte, NC (US)

(72) Inventors: Brandon Sloane, Indian Land, SC (US); Sophie Morgan Danielpour, Durham, NC (US); Serge Alejandro Neri, Charlotte, NC (US); Lauren Jenae Alibey, Charlotte, NC (US); James Thomas MacAulay, Erie, CO (US); Jinyoung Nathan Kim, Charlotte, NC (US)

(73) Assignee: BANK OF AMERICA CORPORATION, Charlotte, NC (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/795,484

(22) Filed: Aug. 6, 2024

(65) Prior Publication Data

US 2024/0394385 A1     Nov. 28, 2024

Related U.S. Application Data

(63) Continuation of application No. 17/723,884, filed on Apr. 19, 2022, now Pat. No. 12,105,812.

(51) Int. Cl.
*G06F 21/57* (2013.01)
*G06F 21/31* (2013.01)
*G06F 21/60* (2013.01)

(52) U.S. Cl.
CPC ............ *G06F 21/602* (2013.01); *G06F 21/31* (2013.01); *G06F 21/577* (2013.01)

(58) Field of Classification Search
CPC ....... G06F 21/602; G06F 21/31; G06F 21/577
See application file for complete search history.

(56) References Cited

U.S. PATENT DOCUMENTS

| | | | |
|---|---|---|---|
| 11,080,533 B2 | 8/2021 | Camilus et al. | |
| 11,218,301 B1 | 1/2022 | Shea et al. | |
| 11,727,310 B1 * | 8/2023 | Arbajian ................. | H04L 9/302 706/12 |

(Continued)

*Primary Examiner* — Stephen T Gundry
(74) *Attorney, Agent, or Firm* — Moore & Van Allen PLLC; Nicholas C. Russell

(57) ABSTRACT

Various systems, methods, and computer program products are provided for complex data encryption. The method includes receiving a user input code from a computing device associated with a user. The user input code is one or more plaintext characters. The method also includes generating a first encrypted value using a first encryption algorithm based on the user input code. The method further includes decrypting the first encrypted value using one or more additional encryption algorithms. The one or more synthetic user input codes are generated by the decryption of the first encrypted value using each of the one or more additional encryption algorithms. The method still further includes determining a first encryption vulnerability score based on the value of the one or more synthetic user input codes. The method also includes causing a transmission of a user input code notification based on the first encryption vulnerability score.

17 Claims, 5 Drawing Sheets

ENTITY
SYSTEM
200

NETWORK
150

ENCRPYTION DETERMINATION ENGINE DEVICE
300

COMPUTING
DEVICE
SYSTEM
400

USER
110

(56) References Cited

U.S. PATENT DOCUMENTS

| | | | |
|---|---|---|---|
| 11,727,490 B1* | 8/2023 | Thakker | G06Q 40/06 |
| | | | 705/36 R |
| 11,727,829 B1* | 8/2023 | Arbajian | H04L 9/14 |
| | | | 380/28 |
| 11,736,281 B1* | 8/2023 | Maganti | G06F 16/2219 |
| | | | 713/150 |
| 11,848,827 B1 | 12/2023 | Haefner | |
| 11,914,707 B1 | 2/2024 | Ramanathan et al. | |
| 2004/0073815 A1 | 4/2004 | Sanai et al. | |
| 2009/0249066 A1 | 10/2009 | Lu et al. | |
| 2013/0159699 A1 | 6/2013 | Torkkel | |
| 2018/0365195 A1 | 12/2018 | Rioul et al. | |
| 2019/0266333 A1 | 8/2019 | Kim et al. | |
| 2020/0029105 A1 | 1/2020 | Bacon | |
| 2021/0099295 A1 | 4/2021 | Li et al. | |
| 2021/0319098 A1 | 10/2021 | Pogorelik et al. | |
| 2021/0350001 A1 | 11/2021 | Alturaifi et al. | |
| 2022/0303837 A1 | 9/2022 | Park et al. | |
| 2022/0309032 A1 | 9/2022 | Gokhale et al. | |
| 2022/0309517 A1 | 9/2022 | Sager et al. | |
| 2022/0311742 A1 | 9/2022 | Zuk et al. | |
| 2022/0321682 A1 | 10/2022 | Berookhim et al. | |
| 2022/0328021 A1 | 10/2022 | Deering et al. | |
| 2022/0334742 A1 | 10/2022 | Stabrawa et al. | |
| 2022/0335418 A1 | 10/2022 | Demarinis et al. | |
| 2022/0335435 A1 | 10/2022 | Giobbi et al. | |
| 2022/0337900 A1 | 10/2022 | Sallas | |
| 2022/0337938 A1 | 10/2022 | Wilker et al. | |
| 2022/0338068 A1 | 10/2022 | Feldman et al. | |
| 2022/0342443 A1 | 10/2022 | Kerr et al. | |
| 2022/0342993 A1 | 10/2022 | Shear et al. | |
| 2022/0343324 A1 | 10/2022 | Ozvat et al. | |
| 2022/0343725 A1 | 10/2022 | Nelson et al. | |
| 2022/0344042 A1 | 10/2022 | Mccrea | |
| 2022/0345524 A1 | 10/2022 | Mitkar et al. | |
| 2022/0345546 A1 | 10/2022 | Shribman et al. | |
| 2022/0345643 A1 | 10/2022 | Braness et al. | |
| 2023/0177172 A1* | 6/2023 | Seth | G06F 21/602 |
| | | | 713/189 |
| 2023/0198966 A1* | 6/2023 | Opushnyev | G06Q 20/3829 |
| 2023/0205896 A1* | 6/2023 | Bridges | G06F 21/602 |
| | | | 713/193 |
| 2023/0252051 A1* | 8/2023 | Stewart | G06F 16/285 |
| | | | 707/740 |
| 2023/0252098 A1* | 8/2023 | Stewart | G06Q 10/10 |
| | | | 707/770 |
| 2023/0252185 A1* | 8/2023 | Stewart | G06F 21/602 |
| | | | 726/30 |
| 2023/0252416 A1* | 8/2023 | Stewart | G06Q 10/06311 |
| | | | 705/321 |
| 2023/0254132 A1* | 8/2023 | Ramanathan | H04L 9/0869 |
| | | | 380/28 |
| 2023/0254139 A1* | 8/2023 | Stewart | H04L 63/126 |
| | | | 713/168 |
| 2023/0254331 A1* | 8/2023 | Wright | H04L 63/1416 |
| | | | 726/22 |
| 2023/0283455 A1* | 9/2023 | Shaffer | H04L 9/3247 |
| | | | 713/171 |
| 2023/0289671 A1* | 9/2023 | Stewart | G06F 18/29 |
| 2023/0289733 A1* | 9/2023 | Stewart | G06Q 10/1053 |
| 2023/0289734 A1* | 9/2023 | Stewart | H04L 9/3236 |
| 2023/0289735 A1* | 9/2023 | Stewart | G06Q 10/1053 |
| 2023/0291542 A1* | 9/2023 | Jaquette | H04L 9/0618 |
| 2023/0297691 A1 | 9/2023 | Stewart | |
| 2023/0299955 A1* | 9/2023 | Lee | H04L 9/14 |
| | | | 713/171 |
| 2023/0300165 A1 | 9/2023 | Fricano et al. | |
| 2023/0319091 A1 | 10/2023 | Clark et al. | |
| 2023/0351026 A1 | 11/2023 | Cross et al. | |
| 2023/0362141 A1 | 11/2023 | Crabtree et al. | |
| 2023/0412626 A1 | 12/2023 | Wright | |
| 2024/0005820 A1 | 1/2024 | Forte et al. | |
| 2024/0022565 A1 | 1/2024 | Keith, Jr. | |
| 2024/0062860 A1 | 2/2024 | Aravamudan et al. | |

* cited by examiner

ENTITY
SYSTEM
200

NETWORK
150

ENCRPYTION DETERMINATION ENGINE DEVICE
300

COMPUTING
DEVICE
SYSTEM
400

USER
110

ENTITY SYSTEM
200

NETWORK COMMUNICATION INTERFACE
210

PROCESSING DEVICE
220

MEMORY DEVICE
230

NETWORK SERVER APPLICATION
240

ENCRPYTION DETERMINATION ENGINE
APPLICATION
250

ONE OR MORE ENTITY APPLICATIONS
270

DATA REPOSITORY
280

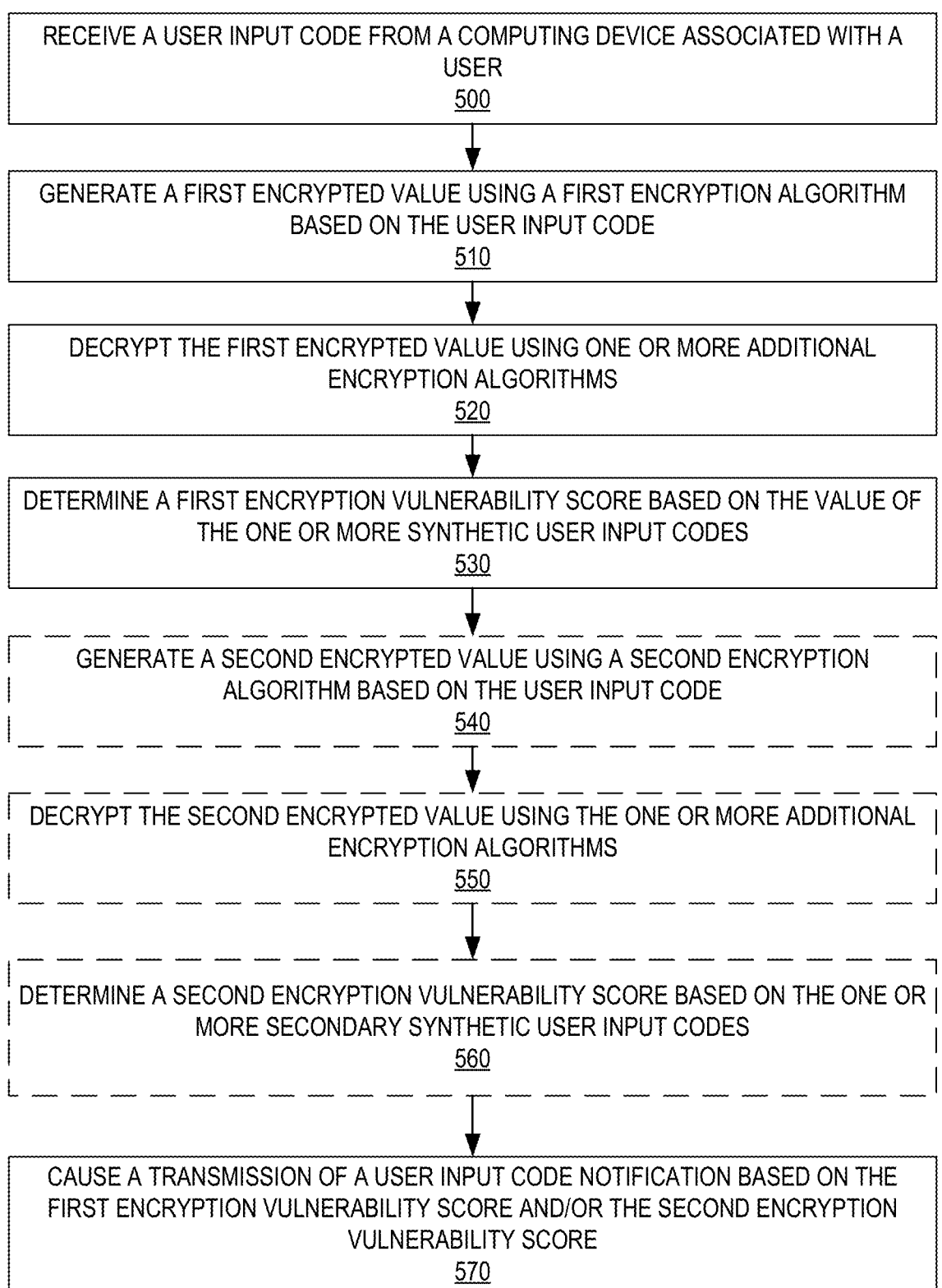

RECEIVE A USER INPUT CODE FROM A COMPUTING DEVICE ASSOCIATED WITH A
USER
500

GENERATE A FIRST ENCRYPTED VALUE USING A FIRST ENCRYPTION ALGORITHM
BASED ON THE USER INPUT CODE
510

DECRYPT THE FIRST ENCRYPTED VALUE USING ONE OR MORE ADDITIONAL
ENCRYPTION ALGORITHMS
520

DETERMINE A FIRST ENCRYPTION VULNERABILITY SCORE BASED ON THE VALUE OF
THE ONE OR MORE SYNTHETIC USER INPUT CODES
530

GENERATE A SECOND ENCRYPTED VALUE USING A SECOND ENCRYPTION
ALGORITHM BASED ON THE USER INPUT CODE
540

DECRYPT THE SECOND ENCRYPTED VALUE USING THE ONE OR MORE ADDITIONAL
ENCRYPTION ALGORITHMS
550

DETERMINE A SECOND ENCRYPTION VULNERABILITY SCORE BASED ON THE ONE OR
MORE SECONDARY SYNTHETIC USER INPUT CODES
560

CAUSE A TRANSMISSION OF A USER INPUT CODE NOTIFICATION BASED ON THE
FIRST ENCRYPTION VULNERABILITY SCORE AND/OR THE SECOND ENCRYPTION
VULNERABILITY SCORE
570

*FIG. 5*

SYSTEM AND METHOD FOR PROVIDING COMPLEX DATA ENCRYPTION

CROSS-REFERENCE TO RELATED APPLICATION

This application is a continuation of and claims priority to U.S. patent application Ser. No. 17/723,884 filed on Apr. 19, 2022, and of the same title; the contents of which are also incorporated herein by reference.

TECHNOLOGICAL FIELD

An example embodiment relates generally to data encryption, and more particularly, to automated processing for providing complex data encryption.

BACKGROUND

Current encryption methods are often susceptible to cryptanalysis techniques, such as frequency analysis, n-tuple analysis, dictionary attacks, and/or brute force hacking. These known cryptanalysis techniques can be used to determine potential decrypted values. Therefore, it is necessary to improve the encryption processes to improve security. There exists a need for a system that makes decrypting data more difficult to improve network security.

BRIEF SUMMARY

The following presents a summary of certain embodiments of the disclosure. This summary is not intended to identify key or critical elements of all embodiments nor delineate the scope of any or all embodiments. Its sole purpose is to present certain concepts and elements of one or more embodiments in a summary form as a prelude to the more detailed description that follows.

In an example embodiment, a system for providing complex data encryption is provided. The system includes at least one non-transitory storage device and at least one processing device coupled to the at least one non-transitory storage device. The at least one processing device is configured to receive a user input code from a computing device associated with a user. The user input code is one or more plaintext characters. The at least one processing device is also configured to generate a first encrypted value using a first encryption algorithm based on the user input code. The at least one processing device is further configured to decrypt the first encrypted value using one or more additional encryption algorithms. One or more synthetic user input codes are generated by the decryption of the first encrypted value using each of the one or more additional encryption algorithms. The at least one processing device is still further configured to determine a first encryption vulnerability score based on the value of the one or more synthetic user input codes. The first encryption vulnerability score is based on one or more similarities between the user input code and the one or more synthetic user input codes. The at least one processing device is also configured to cause a transmission of a user input code notification based on the first encryption vulnerability score.

In some embodiments, the user input code notification is at least one of the user input code or the first encryption algorithm in an instance in which the first encryption vulnerability score is above a threshold vulnerability level. In some embodiments, in an instance in which the first encryption vulnerability score is below a threshold vulnerability level, the at least one processing device is configured to determine a second encryption algorithm to generate a second encrypted value based on the user input code.

In some embodiments, the at least one processing device is configured to generate a second encrypted value using a second encryption algorithm based on the user input code; decrypt the second encrypted value using the one or more additional encryption algorithms with one or more secondary synthetic user input codes being generated by the decryption of the second encrypted value using each of the one or more additional encryption algorithm; and determine a second encryption vulnerability score based on the one or more secondary synthetic user input codes.

In some embodiments, the at least one processing device is configured to generate the user input code notification based on the second encryption algorithm in an instance in which the second encryption vulnerability score is above a threshold vulnerability score. In some embodiments, the second encrypted value generated using a second encryption algorithm based on the user input code is generated in an instance in which the first encryption vulnerability score is below a threshold vulnerability score.

In some embodiments, the at least one processing device is configured to compare the first encryption vulnerability score and the second encryption vulnerability score; and select a primary encryption algorithm between the first encryption algorithm and the second algorithm based on the comparison of the first encryption vulnerability score and the second encryption vulnerability score. In such an embodiment, the user input code notification is based on the primary encryption algorithm.

In another example embodiment, a computer program product for providing complex data encryption is provided. The computer program product includes at least one non-transitory computer-readable medium having computer-readable program code portions embodied therein. The computer-readable program code portions include an executable portion configured to receive a user input code from a computing device associated with a user. The user input code is one or more plaintext characters. The computer-readable program code portions also include an executable portion configured to generate a first encrypted value using a first encryption algorithm based on the user input code. The computer-readable program code portions further include an executable portion configured to decrypt the first encrypted value using one or more additional encryption algorithms. The one or more synthetic user input codes are generated by the decryption of the first encrypted value using each of the one or more additional encryption algorithms. The computer-readable program code portions still further include an executable portion configured to determine a first encryption vulnerability score based on the value of the one or more synthetic user input codes. The first encryption vulnerability score is based on one or more similarities between the user input code and the one or more synthetic user input codes. The computer-readable program code portions also include an executable portion configured to cause a transmission of a user input code notification based on the first encryption vulnerability score.

In some embodiments, the user input code notification is at least one of the user input code or the first encryption algorithm in an instance in which the first encryption vulnerability score is above a threshold vulnerability level. In some embodiments, in an instance in which the first encryption vulnerability score is below a threshold vulnerability level, the computer-readable program code portions also include an executable portion configured to determine a second encryption algorithm to generate a second encrypted value based on the user input code.

In some embodiments, the computer-readable program code portions also include an executable portion configured to generate a second encrypted value using a second encryption algorithm based on the user input code; decrypt the second encrypted value using the one or more additional encryption algorithms with one or more secondary synthetic user input codes being generated by the decryption of the second encrypted value using each of the one or more additional encryption algorithm; and determine a second encryption vulnerability score based on the one or more secondary synthetic user input codes.

In some embodiments, the computer-readable program code portions also include an executable portion configured to generate the user input code notification based on the second encryption algorithm in an instance in which the second encryption vulnerability score is above a threshold vulnerability score. In some embodiments, the second encrypted value generated using a second encryption algorithm based on the user input code is generated in an instance in which the first encryption vulnerability score is below a threshold vulnerability score.

In some embodiments, the computer-readable program code portions also include an executable portion configured to compare the first encryption vulnerability score and the second encryption vulnerability score and, select a primary encryption algorithm between the first encryption algorithm and the second algorithm based on the comparison of the first encryption vulnerability score and the second encryption vulnerability score. In such an embodiment, the user input code notification is based on the primary encryption algorithm.

In still another example embodiment, a computer-implemented method for providing complex data encryption is provided. The method includes receiving a user input code from a computing device associated with a user. The user input code is one or more plaintext characters. The method also includes generating a first encrypted value using a first encryption algorithm based on the user input code. The method further includes decrypting the first encrypted value using one or more additional encryption algorithms. One or more synthetic user input codes are generated by the decryption of the first encrypted value using each of the one or more additional encryption algorithms. The method still further includes determining a first encryption vulnerability score based on the value of the one or more synthetic user input codes. The first encryption vulnerability score is based on one or more similarities between the user input code and the one or more synthetic user input codes. The method also includes causing a transmission of a user input code notification based on the first encryption vulnerability score.

In some embodiments, the user input code notification is at least one of the user input code or the first encryption algorithm in an instance in which the first encryption vulnerability score is above a threshold vulnerability level. In such an embodiment, in an instance in which the first encryption vulnerability score is below a threshold vulnerability level, the method further includes determining a second encryption algorithm to generate a second encrypted value based on the user input code.

In some embodiments, the method also includes generating a second encrypted value using a second encryption algorithm based on the user input code; decrypting the second encrypted value using the one or more additional encryption algorithms, with one or more secondary synthetic user input codes being generated by the decryption of the second encrypted value using each of the one or more additional encryption algorithm; and determining a second encryption vulnerability score based on the one or more secondary synthetic user input codes.

In some embodiments, the method also includes generating the user input code notification based on the second encryption algorithm in an instance in which the second encryption vulnerability score is above a threshold vulnerability score.

In some embodiments, the second encrypted value generated using a second encryption algorithm based on the user input code is generated in an instance in which the first encryption vulnerability score is below a threshold vulnerability score.

In some embodiments, the method also includes comparing the first encryption vulnerability score and the second encryption vulnerability score and selecting a primary encryption algorithm between the first encryption algorithm and the second algorithm based on the comparison of the first encryption vulnerability score and the second encryption vulnerability score. In such an embodiment, the user input code notification is based on the primary encryption algorithm.

Embodiments of the present disclosure address the above needs and/or achieve other advantages by providing apparatuses (e.g., a system, computer program product and/or other devices) and methods for providing complex data encryption. The system embodiments may comprise one or more memory devices having computer readable program code stored thereon, a communication device, and one or more processing devices operatively coupled to the one or more memory devices, wherein the one or more processing devices are configured to execute the computer readable program code to carry out said embodiments. In computer program product embodiments of the disclosure, the computer program product comprises at least one non-transitory computer readable medium comprising computer readable instructions for carrying out said embodiments. Computer implemented method embodiments of the disclosure may comprise providing a computing system comprising a computer processing device and a non-transitory computer readable medium, where the computer readable medium comprises configured computer program instruction code, such that when said instruction code is operated by said computer processing device, said computer processing device performs certain operations to carry out said embodiments.

BRIEF DESCRIPTION OF THE DRAWINGS

Figure 1:
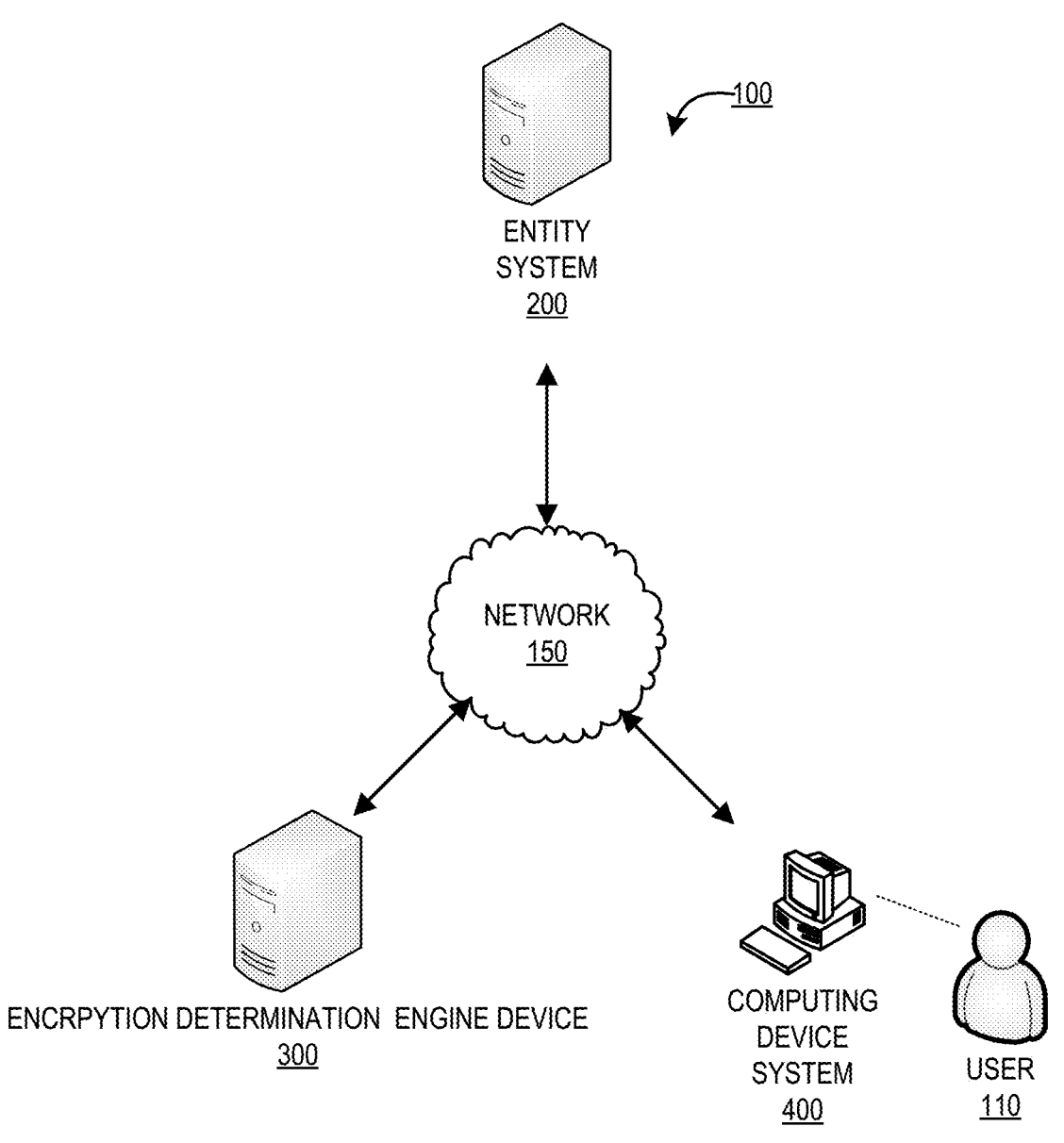
Figure 2:
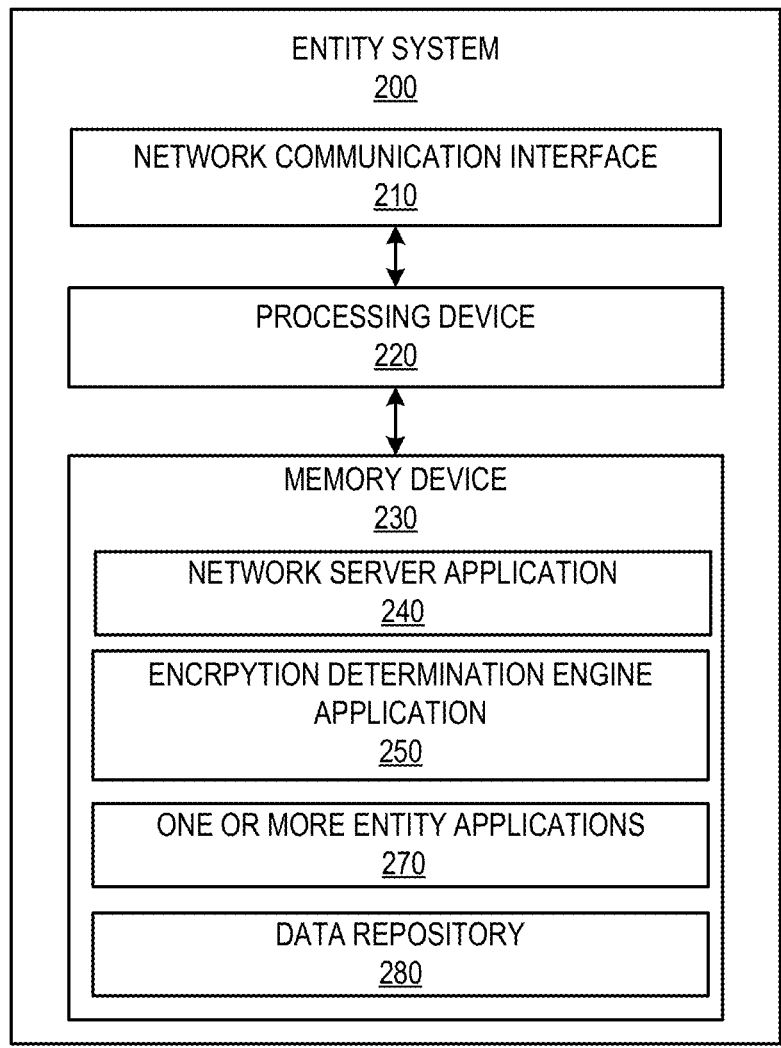
Figure 3:
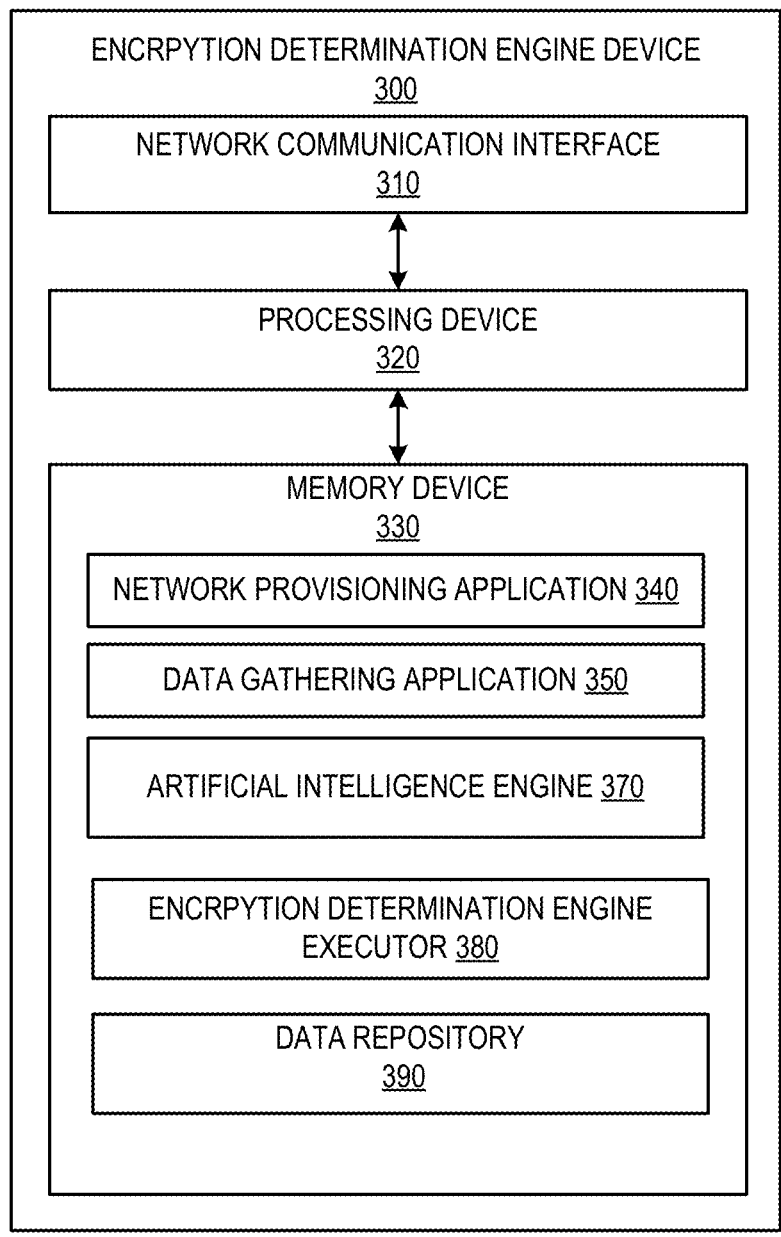
Figure 4:
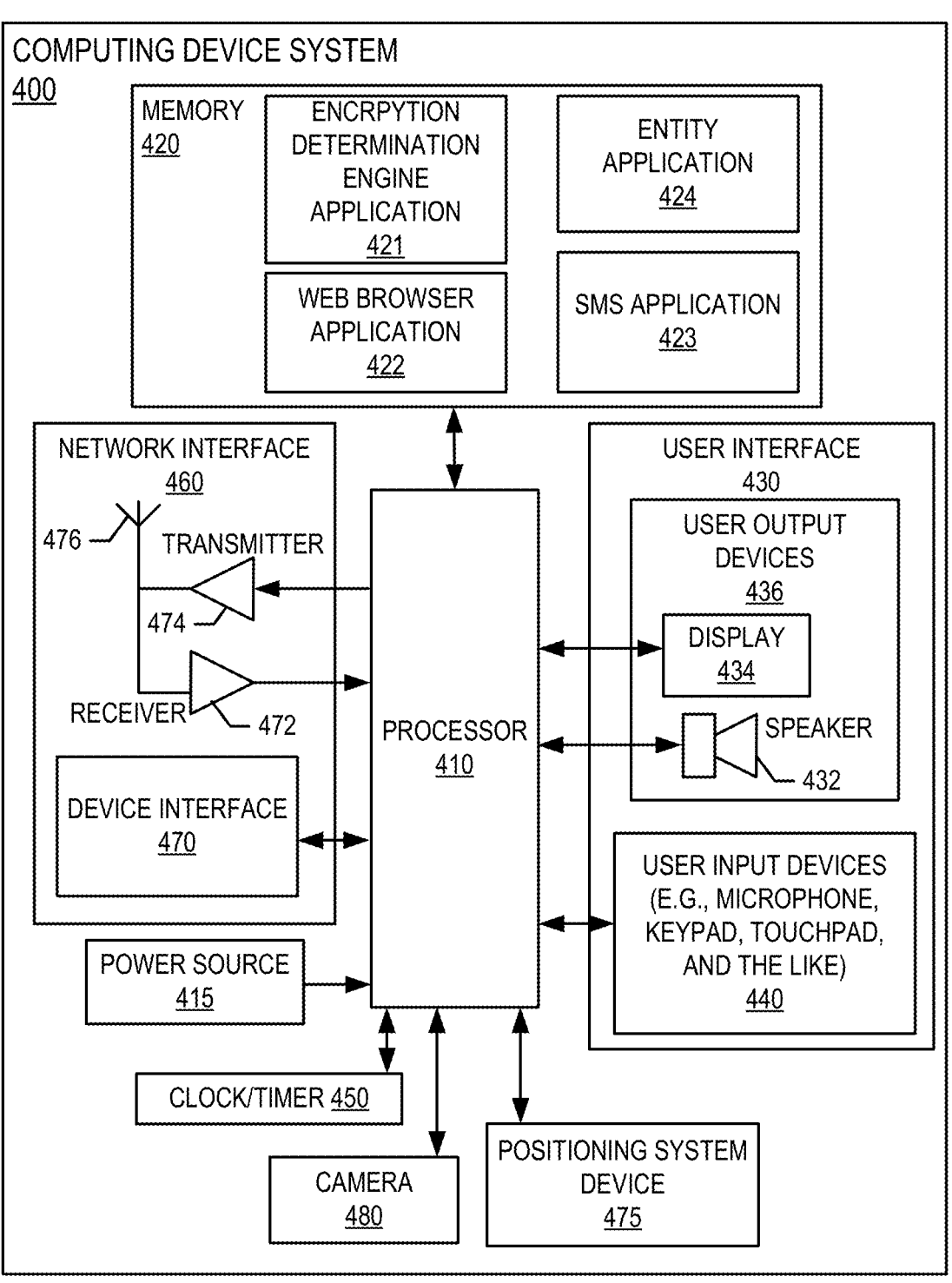

Having thus described embodiments of the disclosure in general terms, reference will now be made the accompanying drawings, wherein:

FIG. 1 provides a block diagram illustrating a system environment for providing complex data encryption, in accordance with embodiments of the present disclosure;

FIG. 2 provides a block diagram illustrating the entity system 200 of FIG. 1, in accordance with embodiments of the present disclosure;

FIG. 3 provides a block diagram illustrating an encryption determination engine device 300 of FIG. 1, in accordance with embodiments of the present disclosure;

FIG. 4 provides a block diagram illustrating the computing device system 400 of FIG. 1, in accordance with embodiments of the present disclosure;

FIG. 5 illustrates a flow chart of the method of providing complex data encryption in accordance with an embodiment of the present disclosure.

DETAILED DESCRIPTION

Embodiments of the present disclosure will now be described more fully hereinafter with reference to the accompanying drawings, in which some, but not all, embodiments of the present disclosure are shown. Indeed, the present disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As described herein, the term "entity" may be any organization that utilizes one or more entity resources, including, but not limited to, one or more entity systems, one or more entity databases, one or more applications, one or more servers, or the like to perform one or more organization activities associated with the entity. In some embodiments, an entity may be any organization that develops, maintains, utilizes, and/or controls one or more applications and/or databases. Applications as described herein may be any software applications configured to perform one or more operations of the entity. Databases as described herein may be any datastores that store data associated with organizational activities associated with the entity. In some embodiments, the entity may be a financial institution which may include herein may include any financial institutions such as commercial banks, thrifts, federal and state savings banks, savings and loan associations, credit unions, investment companies, insurance companies and the like. In some embodiments, the financial institution may allow a customer to establish an account with the financial institution. In some embodiments, the entity may be a non-financial institution.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more applications provided by the entity and/or the system of the present disclosure. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, "machine learning algorithms" may refer to programs (math and logic) that are configured to self-adjust and perform better as they are exposed to more data. To this extent, machine learning algorithms are capable of adjusting their own parameters, given feedback on previous performance in making prediction about a dataset. Machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or any suitable form of machine learning algorithm.

As used herein, "machine learning model" may refer to a mathematical model generated by machine learning algorithms based on sample data, known as training data, to make predictions or decisions without being explicitly programmed to do so. The machine learning model represents what was learned by the machine learning algorithm and represents the rules, numbers, and any other algorithm-specific data structures required to for classification.

Current encryption schemes are susceptible to numerous cryptanalysis techniques including frequency analysis, n-tuple analysis, dictionary attacks, and brute force hacking. While the decryption can be completed using various techniques, it is not possible to determine that the decrypted value is correct. Therefore, potential hackers may perform multiple cryptanalysis techniques until the decrypted value meets a given criteria (e.g., the decrypted value is a potential password that fits the password requirements for the given application).

Various embodiments of the present disclosure provide a system and method for providing complex data encryption. The system receives a user input code from a user. The user input code is composed of plain text characters, such as a password. The system encrypts the user input code using a first encryption algorithm and then attempts to decrypt the encrypted value using various other encryption algorithms. The system determines the vulnerability of the user input based on similarities between the decrypted values from the various other encryption algorithms and one or more expected user input codes. The system may repeat the operations with one or more additional encryption algorithms until the encryption vulnerability score is above a given vulnerability threshold value.

An encryption function includes a user input code (e.g., as plaintext) and an encryption algorithm that encrypts the user input code. An example encryption algorithm includes a secret key and one or more series of mathematical functions performed on the user input code and the secret key to generate the encrypted value. The decryption function includes the encrypted value and the encryption algorithm that decrypts the encrypted value. An example decryption includes apply one or more series of mathematical functions performed on the encrypted value and the secret key to generate the decrypted value (e.g., the user input code).

FIG. 1 provides a block diagram illustrating a system environment 100 for providing complex data encryption. As illustrated in FIG. 1, the system environment 100 includes an encryption determination engine device 300, an entity system 200, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be employees (e.g., application developers, database administrators, application owners, application end users, business analysts, finance agents, or the like) of an entity associated with the entity system 200.

The entity system(s) 200 may be any system owned or otherwise controlled by an entity to support or perform one or more process steps described herein. In some embodiments, the entity is a financial institution. In some embodiments, the entity may be a non-financial institution. In some embodiments, the entity may be any organization that utilizes one or more entity resources to perform one or more organizational activities.

The encryption determination engine device 300 is a system of the present disclosure for performing one or more process steps described herein. In some embodiments, the encryption determination engine device 300 may be an independent system. In some embodiments, the encryption determination engine device 300 may be a part of the entity system 200. For example, the methods discussed herein may be carried out by the entity system 200, the encryption determination engine device 300, the computing device system 400, and/or a combination thereof.

The encryption determination engine device 300, the entity system 200, and/or the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the encryption determination engine device 300 is configured to communicate information or instructions with the entity system 200, and/or the computing device system 400 across the network 150. While the entity system 200, the encryption determination engine device 300, the computing device system 400, and server device(s) are illustrated as separate components communicating via network 150, one or more of the components discussed here may be carried out via the same system (e.g., a single system may include the entity system 200 and the encryption determination engine device 300).

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the encryption determination engine device 300, and/or entity system 200 across the network 150.

FIG. 2 provides a block diagram illustrating the entity system 200, in greater detail, in accordance with embodiments of the disclosure. As illustrated in FIG. 2, in one embodiment, the entity system 200 includes one or more processing devices 220 operatively coupled to a network communication interface 210 and a memory device 230. In certain embodiments, the entity system 200 is operated by a first entity, such as a financial institution. In some embodiments, the entity system 200 may be a multi-tenant cluster storage system.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, an encryption determination engine application 250, one or more entity applications 270, and a data repository 280 comprising data accessed, retrieved, and/or computed by the entity system 200. The one or more entity applications 270 may be any applications developed, supported, maintained, utilized, and/or controlled by the entity. The computer-executable program code of the network server application 240, the encryption determination engine application 250, the one or more entity application 270 to perform certain logic, data-extraction, and data-storing functions of the entity system 200 described herein, as well as communication functions of the entity system 200.

The network server application 240, the encryption determination engine application 250, and the one or more entity applications 270 are configured to store data in the data repository 280 or to use the data stored in the data repository 280 when communicating through the network communication interface 210 with the encryption determination engine device 300, and/or the computing device system 400 to perform one or more process steps described herein. In some embodiments, the entity system 200 may receive instructions from the encryption determination engine device 300 via the encryption determination engine application 250 to perform certain operations. The encryption determination engine application 250 may be provided by the encryption determination engine device 300. The one or more entity applications 270 may be any of the applications used, created, modified, facilitated, and/or managed by the entity system 200. The encryption determination engine application 250 may be in communication with the encryption determination engine device 300. In some embodiments, portions of the methods discussed herein may be carried out by the entity system 200.

FIG. 3 provides a block diagram illustrating the encryption determination engine device 300 in greater detail, in accordance with various embodiments). As illustrated in FIG. 3, in one embodiment, the encryption determination engine device 300 includes one or more processing devices 320 operatively coupled to a network communication interface 310 and a memory device 330. In certain embodiments, the encryption determination engine device 300 is operated by an entity, such as a financial institution. In some embodiments, the encryption determination engine device 300 is owned or operated by the entity of the entity system 200. In some embodiments, the encryption determination engine device 300 may be an independent system. In alternate embodiments, the encryption determination engine device 300 may be a part of the entity system 200.

It should be understood that the memory device 330 may include one or more databases or other data structures/ repositories. The memory device 330 also includes computer-executable program code that instructs the processing device 320 to operate the network communication interface 310 to perform certain communication functions of the encryption determination engine device 300 described herein. For example, in one embodiment of the encryption determination engine device 300, the memory device 330 includes, but is not limited to, a network provisioning application 340, a data gathering application 350, an artificial intelligence engine 370, an encryption determination engine executor 380, and a data repository 390 comprising any data processed or accessed by one or more applications in the memory device 330. The computer-executable program code of the network provisioning application 340, the data gathering application 350, the artificial intelligence engine 370, and the encryption determination engine executor 380 may instruct the processing device 320 to perform certain logic, data-processing, and data-storing functions of the encryption determination engine device 300 described herein, as well as communication functions of the encryption determination engine device 300.

The network provisioning application 340, the data gathering application 350, the artificial intelligence engine 370, and the encryption determination engine executor 380 are configured to invoke or use the data in the data repository 390 when communicating through the network communication interface 310 with the entity system 200, and/or the computing device system 400. In some embodiments, the network provisioning application 340, the data gathering application 350, the artificial intelligence engine 370, and the encryption determination engine executor 380 may store the data extracted or received from the entity system 200, and the computing device system 400 in the data repository 390. In some embodiments, the network provisioning application 340, the data gathering application 350, the artificial intelligence engine 370, and the encryption determination engine executor 380 may be a part of a single application.

FIG. 4 provides a block diagram illustrating a computing device system 400 of FIG. 1 in more detail, in accordance with various embodiments. However, it should be understood that a mobile telephone is merely illustrative of one type of computing device system 400 that may benefit from, employ, or otherwise be involved with embodiments of the present disclosure and, therefore, should not be taken to limit the scope of embodiments of the present disclosure. Other types of computing devices may include portable digital assistants (PDAs), pagers, mobile televisions, electronic media devices, desktop computers, workstations, laptop computers, cameras, video recorders, audio/video player, radio, GPS devices, wearable devices, Internet-of-things devices, augmented reality devices, virtual reality devices, automated teller machine (ATM) devices, electronic kiosk devices, or any combination of the aforementioned. The computing device system 400 of various embodiments may be capable of rendering an API configuration.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include one or more displays 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touch-pad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, an encryption determination engine application 421, entity application 424. These applications also typically instructions to a graphical user interface (GUI) on the display 430 that allows the user 110 to interact with the entity system 200, the encryption determination engine device 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the encryption determination engine application 421 provided by the encryption determination engine device 300 allows the user 110 to access the encryption determination engine device 300. In some embodiments, the entity application 424 provided by the entity system 200 and the encryption determination engine application 421 allow the user 110 to access the functionalities provided by the encryption determination engine device 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 illustrates another example method of providing complex data encryption. The method may be carried out by a system discussed herein (e.g., the entity system 200, the encryption determination engine device 300, the computing device system 400, and/or the local device(s) 500). An example system may include at least one non-transitory storage device and at least one processing device coupled to the at least one non-transitory storage device. In such an embodiment, the at least one processing device is configured to carry out the method discussed herein.

Referring now to Block 500 of FIG. 5, the method includes receiving a user input code from a computing device associated with a user. The user input code includes one or more plaintext characters. The user input code may be a password, credit card number, and/or any plaintext characters that are intended to be encrypted. The user input code may be a word or series of words. Additionally or alternatively, the user input code may include numbers (e.g., credit card number). In some embodiments, a user may be prompted, via a user interface of the computing device system 400 to input the user input code. For example, an application or website may request a user to create a password.

Referring now to Block 510 of FIG. 5, the method includes generating a first encrypted value using a first encryption algorithm based on the user input code. In some embodiments, the system may prompt a user to indicate a desired encryption algorithm or target encryption algorithm. Alternatively, the method may include asking the user one or more questions in order to determine the encryption algorithm (e.g., the questions may relate to the desired security level and an encryption algorithm may be selected based on the desired security level). In an example embodiment, the first encryption algorithm is a series of mathematical operations with two or more unknown variables. The user input code, along with a secret code are used as the unknown variables to generate an encrypted value (e.g., a ciphertext).

Referring now to Block 520 of FIG. 5, the method includes decrypting the first encrypted value using one or more additional encryption algorithms. The one or more additional encryption algorithms may be the same series of mathematical operations using different secret keys than the known secret key. Additionally or alternatively, the one or more additional encryption algorithms may be one or more different mathematical operations that use the same or different secret keys. The additional encryption algorithms may include strategies used by various hacking techniques, such as frequency analysis, n-tuple analysis, dictionary attacks, and and/or brute force methods. The decrypted value is a synthetic user input code that is used to compare to expected user input codes, as discussed below in reference to Block 530 of FIG. 5.

Referring now to Block 530 of FIG. 5, the method includes determining a first encryption vulnerability score based on the value of the one or more synthetic user input codes. The first encryption vulnerability score is based on one or more similarities of the synthetic user input code(s) to the user input code. The encryption vulnerability score may be based on the similarities between the synthetic user input code(s) and one or more expected user input codes. Expected user input codes may be one or more set of characters that meet a given criteria for a user input code. For example, in an instance in which the user input code is a password, the password requirement may require a certain number of letters, numbers, and/or symbols and the expected user data inputs may be one or more potential passwords that meet said requirements.

The first encryption vulnerability score may be determined using a combination of frequency analysis and n-tuple analysis examining the similarities between the synthetic user input codes and the expected input codes. The first encryption vulnerability score is a relative score for the first encryption algorithm based on the number and similarity scores of the synthetic user input code(s).

Referring now to optional Block 540 of FIG. 5, the method includes generating a second encrypted value using a second encryption algorithm based on the user input code. The second encryption algorithm may be the same series of mathematical operations as the first encryption algorithm with a different secret key used. As such, the second encrypted value will be different than the first encrypted value. Alternatively, the second encryption algorithm may be a different set of mathematical operations using the same or different secret keys. The user input code can then be input into the second encryption algorithm to generate the second encrypted value.

The second encrypted value may be generated using similar techniques to the operations discussed in referenced to generating the first encrypted value. In some embodiments, the second encrypted value may be generated in an instance in which the first encryption vulnerability score is below a threshold vulnerability score. Alternatively, the second encrypted value may be generated in parallel (e.g., the first encrypted value and the second encrypted value may be generated before analyzing the first encryption vulnerability score is complete to determine whether the first encryption vulnerability score is below the threshold vulnerability score).

Additional encrypted values (e.g., a third encrypted value, a fourth encrypted value, etc.) may be generated using the user input code and one or more encryption algorithms. The encryption vulnerability scores of each may be determined as discussed in reference to the determined of the encryption vulnerability score of the first encrypted value and the second encrypted value.

Referring now to optional Block 550 of FIG. 5, the method includes decrypting the second encrypted value using the one or more additional encryption algorithms. The decryption of the second encrypted value may be the same process as the decryption of the first encrypted value discussed above in reference to Block 520 of FIG. 5. The one or more additional encryption algorithms may be the same series of mathematical operations as used to generate the second encrypted value using different secret keys than the known secret key. Additionally or alternatively, the one or more additional encryption algorithms may be one or more different mathematical operations that use the same or different secret keys. The additional encryption algorithms may include strategies used by various hacking techniques, such as frequency analysis, n-tuple analysis, dictionary attacks, and and/or brute force methods. The decrypted value is a synthetic user input code that is used to compare to expected user input codes, as discussed below in reference to Block 560 of FIG. 5.

Referring now to optional Block 560 of FIG. 5, the method includes determining a second encryption vulnerability score based on the one or more secondary synthetic user input codes. The second encryption vulnerability score may be the same process as used to determine the first encryption vulnerability score discussed above in reference to Block 530 of FIG. 5.

The second encryption vulnerability score is based on one or more similarities of the synthetic user input code(s) generated from the second encrypted value to the user input code. The encryption vulnerability score may be based on the similarities between the synthetic user input code(s) and one or more expected user input codes. Expected user input codes may be one or more set of characters that meet a given criteria for a user input code. For example, in an instance in which the user input code is a password, the password requirement may require a certain number of letters, numbers, and/or symbols and the expected user data inputs may be one or more potential passwords that meet said requirements.

The second encryption vulnerability score may be determined using a combination of frequency analysis and n-tuple analysis examining the similarities between the synthetic user input codes and the expected input codes. The second encryption vulnerability score is a relative score for the second encryption algorithm based on the number and similarity scores of the synthetic user input code(s).

Referring now to Block 570 of FIG. 5, the method includes causing a transmission of a user input code notification based on the first encryption vulnerability score and/or the second encryption vulnerability score. The user input code notification may include information relating to the user input code, the selected encryption algorithm (e.g., the secret key), and/or the encrypted value. The user input code notification may be transmitted to the computing device system 400 and/or a third party system (e.g., the encrypted value may be sent to a vendor or otherwise for processing).

The given encryption algorithm may be selected based on the encryption vulnerability score. In some embodiments, the encryption algorithm selected is the first encrypted value that has an encryption vulnerability score above a vulnerability threshold score. For example, in an instance in which the first encryption vulnerability score is above the vulnerability threshold score, the first encrypted value may be selected.

In some embodiments, in an instance in which multiple encryption vulnerability scores are above the vulnerability threshold score, the encryption vulnerability scores may be compared with one another. For example, the first encryption vulnerability score and the second encryption vulnerability score may be compared to one another with the higher encryption vulnerability score being selected as the selected encryption algorithm.

Machine learning may be used to teach the system as the processes discussed herein are repeated. For example, the user input codes may be used to determined expected user input codes for subsequent operations. The system may use the user input code as a part of a training set to be used in subsequent operations.

As will be appreciated by one of skill in the art, the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure may take the form of an entirely hardware embodiment, an entirely software embodiment (including firmware, resident software, micro-code, and the like), or an embodiment combining software and hardware aspects that may generally be referred to herein as a "system." Furthermore, embodiments of the present disclosure may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present disclosure may be written in an object oriented, scripted or unscripted programming language such as Java, Perl, Smalltalk, C++, or the like. However, the computer program code for carrying out operations of embodiments of the present disclosure may also be written in conventional procedural programming languages, such as the "C" programming language or similar programming languages.

Embodiments of the present disclosure are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the disclosure.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present disclosure are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad disclosure, and that this disclosure is not limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the disclosure. Therefore, it is to be understood that, within the scope of the appended claims, the disclosure may be practiced other than as specifically described herein.

What is claimed is:

1. A system for providing complex data encryption, the system comprising:

at least one non-transitory storage device comprising computer-readable code; and at least one processing device coupled to the at least one non-transitory storage device, wherein the computer-readable code is configured to cause the at least one processing device to:

receive a user input code from a computing device
associated with a user, wherein the user input code is
one or more plaintext characters;

generate a first encrypted value using a first encryption
algorithm based on the user input code;

decrypt the first encrypted value using one or more
additional encryption algorithms, wherein one or
more synthetic user input codes are generated by the
decryption of the first encrypted value using each of
the one or more additional encryption algorithms;

determine a first encryption vulnerability score based
on the value of the one or more synthetic user input
codes, wherein the first encryption vulnerability
score is based on one or more similarities between
the user input code and the one or more synthetic
user input codes;

generate a second encrypted value using a second
encryption algorithm based on the user input code, decrypt the second encrypted value using the one or
more additional encryption algorithms, wherein one
or more secondary synthetic user input codes are
generated by the decryption of the second encrypted
value using each of the one or more additional
encryption algorithm;

determine a second encryption vulnerability score
based on the one or more secondary synthetic user
input codes;

compare the first encryption vulnerability score and the
second encryption vulnerability score; and based on the comparison of the first encryption vulner-
ability score and the second encryption vulnerability
score, select a primary encryption algorithm between
the first encryption algorithm and the second algo-
rithm.

2. The system of claim 1, wherein the computer-readable
code is further configured to cause the at least one process-
ing device to cause a transmission of a user input code
notification, wherein said user input code notification is
based on one of: the first encryption vulnerability score or on
the primary encryption algorithm.

3. The system of claim 1, code is further configured to
cause the at least one processing device to cause a trans-
mission of a user input code notification, wherein the user
input code notification is at least one of the user input code
or the first encryption algorithm in an instance in which the
first encryption vulnerability score is above a threshold
vulnerability level.

4. The system of claim 1, wherein the computer-readable
code is further configured to cause the at least one process-
ing device to cause a transmission of a user input code
notification, wherein said user input code notification is
based on the second encryption algorithm in an instance in
which the second encryption vulnerability score is above a
threshold vulnerability score.

5. The system of claim 1, wherein in an instance in which
the first encryption vulnerability score is below a threshold
vulnerability level, the at least one processing device gen-
erates the second encrypted value based on the user input
code.

6. The system of claim 1, wherein the second encrypted
value generated using a second encryption algorithm based
on the user input code is generated in an instance in which
the first encryption vulnerability score is below a threshold
vulnerability score.

7. A computer program product for providing complex
data encryption, the computer program product comprising
at least one non-transitory computer-readable medium having computer-readable program code portions embodied
therein, the computer-readable program code portions com-
prising:

an executable portion configured to receive a user input
code from a computing device associated with a user,
wherein the user input code is one or more plaintext
characters;

an executable portion configured to generate a first
encrypted value using a first encryption algorithm
based on the user input code;

an executable portion configured to decrypt the first
encrypted value using one or more additional encryp-
tion algorithms, wherein one or more synthetic user
input codes are generated by the decryption of the first
encrypted value using each of the one or more addi-
tional encryption algorithms;

an executable portion configured to determine a first
encryption vulnerability score based on the value of the
one or more synthetic user input codes, wherein the first
encryption vulnerability score is based on one or more
similarities between the user input code and the one or
more synthetic user input codes;

an executable portion configured to generate a second
encrypted value using a second encryption algorithm
based on the user input code;

an executable portion configured to decrypt the second
encrypted value using the one or more additional
encryption algorithms, wherein one or more secondary
synthetic user input codes are generated by the decryp-
tion of the second encrypted value using each of the one
or more additional encryption algorithm;

an executable portion configured to determine a second
encryption vulnerability score based on the one or more
secondary synthetic user input codes;

an executable portion configured to compare the first
encryption vulnerability score and the second encryp-
tion vulnerability score; and an executable portion configured to, based on the com-
parison of the first encryption vulnerability score and
the second encryption vulnerability score, select a
primary encryption algorithm between the first encryp-
tion algorithm and the second algorithm.

8. The computer program product of claim 7 further
comprising an executable portion configured to cause a
transmission of a user input code notification, wherein said
user input code notification is based on one of: the first
encryption vulnerability score or on the primary encryption
algorithm.

9. The computer program product of claim 7, further
comprising an executable portion configured to cause a
transmission of a user input code notification, wherein the
user input code notification is at least one of the user input
code or the first encryption algorithm in an instance in which
the first encryption vulnerability score is above a threshold
vulnerability level.

10. The computer program product of claim 7, further
comprising an executable portion configured to cause a
transmission of a user input code notification, wherein said
user input code notification is based on the second encryp-
tion algorithm in an instance in which the second encryption
vulnerability score is above a threshold vulnerability score.

11. The computer program product of claim 7, wherein in
an instance in which the first encryption vulnerability score
is below a threshold vulnerability level, the computer-
readable program code portions still further include an
executable portion configured to determine the second
encrypted value.

12. The computer program product of claim 7, wherein the second encrypted value generated using a second encryption algorithm based on the user input code is generated in an instance in which the first encryption vulnerability score is below a threshold vulnerability score.

13. A computer-implemented method for providing complex data encryption, the method comprising:

receiving a user input code from a computing device associated with a user, wherein the user input code is one or more plaintext characters;

generating a first encrypted value using a first encryption algorithm based on the user input code;

decrypting the first encrypted value using one or more additional encryption algorithms, wherein one or more synthetic user input codes are generated by the decryption of the first encrypted value using each of the one or more additional encryption algorithms;

determining a first encryption vulnerability score based on the value of the one or more synthetic user input codes, wherein the first encryption vulnerability score is based on one or more similarities between the user input code and the one or more synthetic user input codes;

generating a second encrypted value using a second encryption algorithm based on the user input code;

decrypting the second encrypted value using the one or more additional encryption algorithms, wherein one or more secondary synthetic user input codes are generated by the decryption of the second encrypted value using each of the one or more additional encryption algorithm;

determining a second encryption vulnerability score based on the one or more secondary synthetic user input codes;

comparing the first encryption vulnerability score and the second encryption vulnerability score; and based on the comparison of the first encryption vulnerability score and the second encryption vulnerability score, selecting a primary encryption algorithm between the first encryption algorithm and the second algorithm.

14. The method of claim 13 further comprising causing a transmission of a user input code notification, wherein said user input code notification is based on one of: the first encryption vulnerability score or on the primary encryption algorithm.

15. The method of claim 13, further comprising causing a transmission of a user input code notification, wherein the user input code notification is at least one of the user input code or the first encryption algorithm in an instance in which the first encryption vulnerability score is above a threshold vulnerability level, and wherein in an instance in which the first encryption vulnerability score is below a threshold vulnerability level, the method generates the second encrypted value based on the user input code.

16. The method of claim 13, further comprising causing a transmission of a user input code notification, wherein said user input code notification is based on the second encryption algorithm in an instance in which the second encryption vulnerability score is above a threshold vulnerability score.

17. The method of claim 13, wherein the second encrypted value generated using a second encryption algorithm based on the user input code is generated in an instance in which the first encryption vulnerability score is below a threshold vulnerability score.

* * * * *